United States Patent [19]

Baxter et al.

[11] 4,379,986
[45] Apr. 12, 1983

[54] STALL SENSING CIRCUIT FOR SHADED POLE MOTORS

[75] Inventors: Donald J. Baxter, Simpsonville; Hugh L. Childress, Jr., Gray Court, both of S.C.

[73] Assignee: Marquette Metal Products Co., Fountain Inn, S.C.

[21] Appl. No.: 295,655

[22] Filed: Aug. 24, 1981

[51] Int. Cl.[3] .............................................. H02H 7/085
[52] U.S. Cl. .................................... 318/434; 318/798; 361/30; 361/31; 361/94; 361/96
[58] Field of Search ....................... 318/434, 806, 798; 361/30, 31, 94, 96

[56] References Cited

U.S. PATENT DOCUMENTS 4,327,391  4/1982  Grzebielski .......................... 361/31

Primary Examiner—J. V. Truhe
Assistant Examiner—P. Keane
Attorney, Agent, or Firm—Stephen A. Roen; Arthur L. Frederick

[57] ABSTRACT

A motor control circuit for disconnecting the motor's power supply when the motor is stalled but maintaining it connected when it is running comprising a power loop and control loop, the former including a signal sensing means which provides an output sensing signal whose magnitude is a function of the motor's state in series with an ON, OFF switching means' input-output terminals which is responsive to the magnitude of a control signal applied to its control terminal to control its state. The control loop comprises a counter which provides a control output signal in response to a predetermined count and whose input is fed by the output of a voltage controlled oscillator whose frequency is a function of the magnitude of the output sensing signal of the signal sensing means to which it is connected. A resetting means is coupled to the reset terminal of the counter for periodically resetting the counter. The output control signal from the counter is fed to the control terminal of the switching means. The resetting signal occurs prior to the counter's predetermined count when the motor is running thereby turning the switching means ON to provide motor power; however, when the motor stalls, the reset signal occurs before the counter reaches the predetermined count, thereby producing a control signal which turns the switching means OFF, thereby disconnecting the motor's power supply.

9 Claims, 1 Drawing Figure

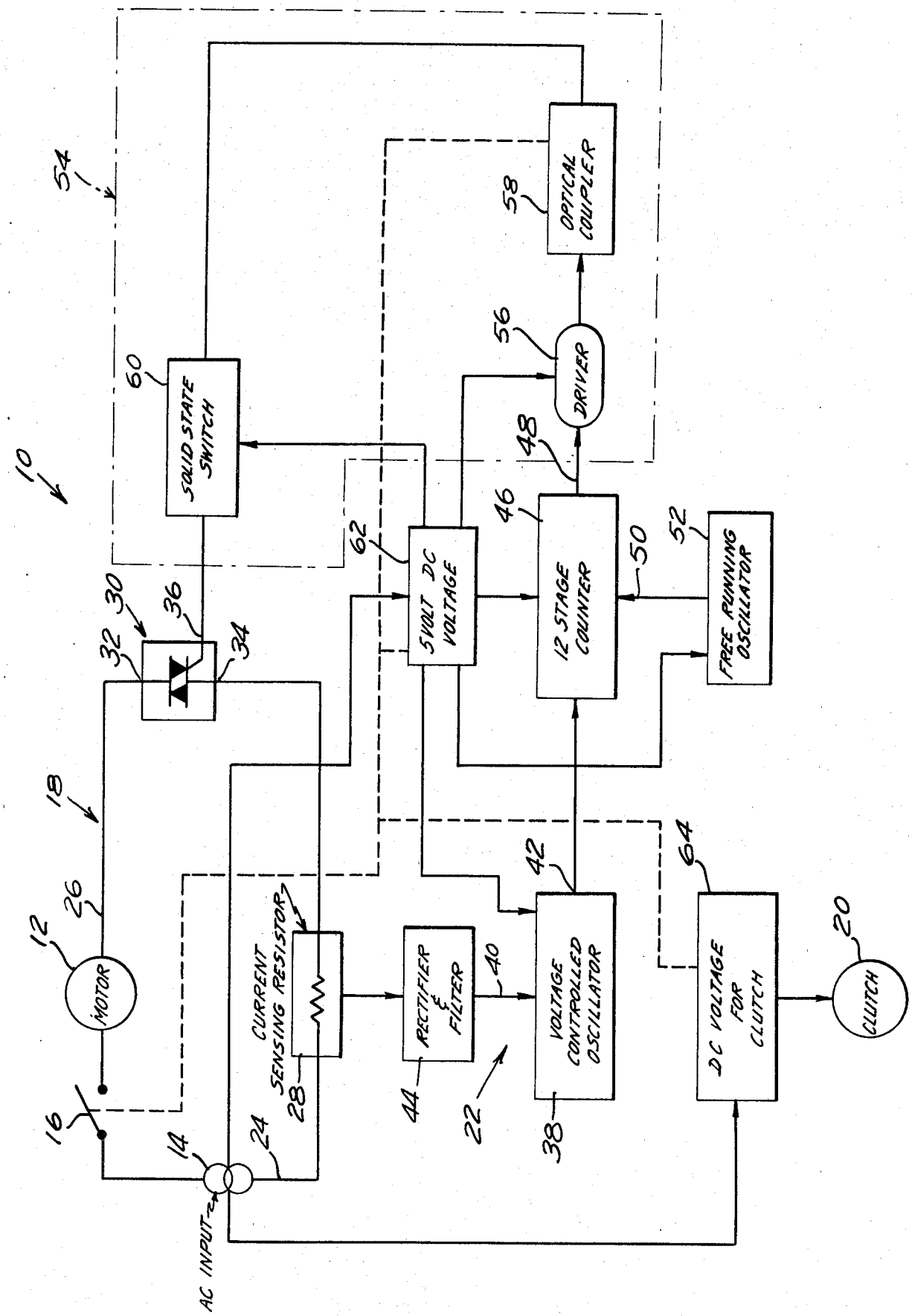

STALL SENSING CIRCUIT FOR SHADED POLE MOTORS

BACKGROUND OF THE INVENTION

This invention relates to a motor control circuit for automatically uncoupling its motor's power supply during a stall condition while maintaining it coupled in its running condition and, more particularly, relates to a shaded pole motor control circuit of the aforesaid type.

Motors, and in particular shaded pole motors, have been used in applications wherein they are overloaded resulting in their stalling; that is their normally rotating armature is stationary under power. Such a condition results in unnecessarily heavy power consumption and increased operating temperatures. A method heretofore used to at least decrease the motor's operating temperature has been to completely submerge the motor in transformer oil. This method though decreasing its temperature does not reduce its power consumption and has other obvious disadvantages.

Accordingly, it is an object of this invention to provide an improved motor control circuit for automatically uncoupling its motor's power supply during a stall condition while maintaining it coupled in its running condition whereby the motor's power consumption is reduced.

It is a further object of the present invention to provide a motor control circuit of the aforesaid type wherein the motor's operating temperature is lowered.

Another object of the present invention is to provide a motor control circuit of the aforesaid type wherein the motor's operating life is extended.

A still further object of this invention is to provide a shaded pole motor control circuit for automatically uncoupling its motor's power supply during a stall condition while maintaining it coupled in its running condition wherein the motor's power consumption is reduced and wherein its operating temperature is lowered thereby extending its operating life.

Other objects of the invention will become apparent upon reading the specification in connection with the accompanying drawings.

SUMMARY OF THE INVENTION

Accordingly, the present invention contemplates a motor control circuit for automatically uncoupling its motor's power supply during a stall condition while maintaining the power supply connected during its normal, running condition, comprising a power loop and a control loop. The power loop includes a power supply coupling means, a motor connecting means, a signal sensing means, and a switching means, all connected in series. The control loop comprises a controlled oscillator means, a counting means, a resetting means, and a coupling means.

The signal sensing means provides an output sensing signal to an input of the controlled oscillator means the magnitude of which is a function of the motor's condition. The switching means has a conduction and non-conduction state and has an output, input and control terminal and the output and input terminals are connected in series in the power loop; it is also responsive to the magnitude of a control signal applied at its control terminal to control its state.

The controlled oscillator means has an input and output and has its input coupled to the signal sensing means; it generates an output signal having a frequency which is a function of the sensing signal's magnitude. The counting means has an input, output and reset terminal, and provides a control signal at its output in response to a predetermined count and resets when a reset signal is applied to its reset terminal; the output of the controlled oscillator is coupled to its input. The resetting means is coupled to the counting means' reset terminal and periodically provides a reset signal thereto. The coupling means is connected to the counting means' output and to the switching means' control terminal and transmits a control signal from the counting means for changing the switching means' state.

In a narrower aspect of the invention the reset signal is timed so as to occur prior to the predetermined count in response to the output signals generated during the running condition as well as occurring after the predetermined count in response to output signals generated during the stalled condition.

BRIEF DESCRIPTION OF THE DRAWING

The invention will be more fully understood from the following detailed description thereof when considered in connection with the accompanying drawing wherein but one embodiment is illustrated by way of example and wherein the sole FIGURE is a functional block diagram of the motor control circuit for automatically uncoupling its motor's power supply during a stalled condition while maintaining it coupled in its running condition, according to this invention.

DETAILED DESCRIPTION OF THE PREFERRED EMBODIMENT

Now, referring to the drawing, the reference numeral 10 generally designates the motor control circuit for automatically uncoupling its motor's power supply during a stall condition while maintaining it coupled in its running condition, the motor itself 12, which is conventional but preferably a shaded pole motor, the motor's conventional power supply "AC input" 14, a conventional series switch 16, the later three elements comprising a first portion of a power loop generally designated 18, and a conventional clutch 20 for the motor 12. The motor control circuit 10 comprises a second portion of the power loop 18 and a control loop generally designated 22.

The second portion of the power loop comprises a power supply coupling means or conventional leads 24, motor connecting means or conventional leads 26, a signal sensing means for providing an output sensing signal, the magnitude or amplitude of which is a function of the condition of the motor or conventional current sensing resistor 28, and a conventional switching means 30, preferably a TRIAC solid state switch, having a conduction and non-conduction state, ON or OFF respectively, and having an output 32, input 34 and control or gate terminal 36, the output and input terminals 32 and 34, respectively, connected in series with all the other elements in the power loop, and wherein the state of the switching means 30 is responsive to the magnitude or amplitude of a control signal applied at its control terminal 36.

The control loop 22 comprises a conventional controlled oscillator means or voltage controlled oscillator 38, having an input and output, 40 and 42, respectively, its input 40 coupled through a conventional rectifier and filter 44 to the output of the current sensing resistor 28, and which provides an output signal at its output 42 the frequency of which is a function of, and proportional to the voltage magnitude of its input voltage or sensing signal's voltage amplitude. Its output 42 is coupled to the input of a conventional counting means or counter 46, preferably a twelve-stage ripple counter, having an output and reset terminal, 48 and 50, respectively, for providing a control signal at its output 50 in response to a predetermined count, in this embodiment 2048 and being resettable when a reset signal is applied to its reset terminal 50. Its reset terminal is coupled to a conventional resetting means or free-running oscillator 52, for periodically providing a reset signal, in this embodiment one cycle per second, to the counter's reset terminal 50. The counter's output terminal 48, is connected to the control terminal 36 of TRIAC 30 through conventional coupling means generally designated 54, which function to conventionally transmit a control signal from the counter 46 for changing the state of the switching means of TRIAC 30.

The coupling means 54 comprises a conventional driver circuit or buffer amplifier 56 whose input is connected to the counter's output terminal 48 and whose output is connected to a conventional optical coupler circuit or optical isolator 58 having an output which is connected through a conventional solid state switch 60 to the TRIAC's gate 36.

A conventional D.C. voltage supply 62 is provided to supply the required power for the circuit; a separate conventional D.C. power supply 64 is provided to supply power to the motor's clutch 20.

To operate the motor 12 switch 16 is closed thereby completing the series power loop 18 and engaging the clutch 20 thereby coupling the motor's shaft to the load (not shown). Under normal motor load conditions current flows through the series sensing resistor 28 as the TRIAC 30, the switching means, is normally biased ON, that is it is fully conducting; the motor 12 then is in its running condition, that is its shaft is rotating. An output sensing signal is then developed across sensing resistor 28 and is coupled through rectifier-filter 44 to the input 40 of voltage controlled oscillator 38. The magnitude or amplitude of this voltage sensing signal applied to input 40, which is a function of the condition of the motor 12, is approximately six volts in this embodiment under running conditions and it causes the voltage controlled oscillator 38 to generate an output signal at its output 42, the frequency of which is a function of the magnitude of the sensing signal, and in this embodiment, in the running condition, its frequency is about 1800 hertz. The free-running oscillator 52 provides a reset signal to the input terminal 50 of counter 46 and resets the counter 46 periodically at its repetition rate and in this embodiment every second, its frequency being one hertz. The counter 46 having been designed to provide an output control signal at its output 48 in response to a predetermined count and in this embodiment preferably at a count of 2048, will only count up to about 1800 and accordingly no control signal will be produced at its output 48 and therefore the conduction state of the TRIAC switching means 30 will remain the same, ON, and the power loop 18 will be uninterrupted. Under these conditions, the normal running condition, the counter 46 will be continuously reset before it ever reaches its predetermined count of 2048 as the counter 46 will be continuously reset every one second by the resetting signal whose frequency of one hertz controls its resetting time. However, if the motor stalls due to a stall condition as a result, for example, of a jammed louvre opening system (not shown), the current in the power loop 18 increases thereby increasing the output sensing signal developed across sensing resistor 28, which when applied to input 40 of the voltage controlled oscillator 38 causes it to generate an output signal at its output 42 at an increased frequency, and in the stalled condition in this embodiment over 2048 hertz. In this condition or mode the counter 46 will fill up or count to its predetermined count of 2048 thereby producing a control signal at its output 48 prior to its being reset by the resetting means, free running oscillator 52. This control signal will then be coupled to the control terminal 36 of TRIAC 30 through driver 56, optical coupler 58, and switch 60, in the control loop 22, to gate or turn off the TRIAC 30 thereby changing its state to one of non-conduction or OFF. When this TRIAC switch 30 is in its OFF state the power loop 18 is opened thereby automatically disconnecting the motor's power supply 14 from the motor 12. To restart the motor 12 after a stalled condition, the switch 16 is opened and reclosed.

It is believed now readily apparent that the present invention's sensing of a stall condition to thereby automatically remove the power from the motor reduces the motor's power consumption as well as lowering its operating temperature by reducing heat rise which would otherwise result from the motor being left in its stall condition with its power still connected.

It also achieves an extension of the motor's life due to its lower operating temperature.

While a preferred embodiment of the present invention has been shown and described, it will be obvious to those skilled in the art that various modifications and substitutions may be made without departing from the spirit of the invention which is limited only within the scope of the appended claims.

What is claimed is:

1. A motor control circuit for automatically uncoupling its motor's power supply during a stall condition while maintaining it coupled in its running condition comprising:

power supply coupling means;
motor connecting means;
signal sensing means for providing an output sensing signal, the magnitude of which is a function of the condition of the motor's load;
switching means having a conduction and non-conduction state and having an output, input and control terminal, the output and input terminals connected in series with said power supply coupling means, motor connecting means and signal sensing means, responsive to the magnitude of a control signal applied to its control terminal to control its state;
controlled oscillator means, having an input and output, coupled at its input to said signal sensing means, for generating an output signal the frequency of which is a function of the magnitude of the sensing signal;
counting means having an input, output and reset terminal, for providing a control signal at its output in response to a predetermined count and for resetting said counting means when a reset signal is applied to said reset terminal, the input of said counting means being coupled to the output of said controlled oscillator means;
resetting means, coupled to said counting means; reset terminal, for providing a reset signal to said reset terminal prior to and after said predetermined count in response to the output signals generated during running condition and stall condition respectively; and coupling means, connected to the output of said counting means and to the control terminal of said switching means, for transmitting a control signal from said counting means for changing said switching means' state.

2. A motor control circuit according to claim 1, wherein said reset signal has a frequency sufficient to reset the counting means prior to a predetermined count during running condition but insufficient during stall condition.

3. A motor control circuit according to claim 1, wherein said controlled oscillator means comprises a voltage controlled oscillator.

4. A motor control circuit according to claim 3, wherein said resetting means comprises a free running oscillator.

5. A motor control circuit according to claim 4, wherein said signal sensing means comprises a resistor for providing an output voltage sensing signal, the amplitude of which is a function of the motor's condition.

6. A motor control circuit according to claim 5, wherein said switching means comprises a TRIAC.

7. A motor control circuit according to claim 6, wherein said coupling means comprises an optical coupler circuit having an output and input.

8. A motor control circuit according to claim 7, wherein said coupling means includes a driver circuit having an output and input.

9. A motor control circuit according to claim 8, wherein said coupling means includes a control circuit having an output and input terminal said output terminal coupled to said switching means' input terminal for controlling its state and wherein said output of said optical coupler circuit is coupled to the input terminal of said control circuit for controlling its conduction state, and wherein said driver's output is coupled to said optical coupler circuit's input and wherein its input is coupled to said counting means' output terminal.

* * * * *